US008101838B2

(12) United States Patent
Sun et al.

(10) Patent No.: US 8,101,838 B2
(45) Date of Patent: Jan. 24, 2012

(54) WATER-SOLUBLE NANOPARTICLES WITH CONTROLLED AGGREGATE SIZES

(75) Inventors: Dazhi Sun, College Station, TX (US); William Neil Everett, Bryan, TX (US); Hung-Jue Sue, College Station, TX (US); Nobuo Miyatake, Houston, TX (US)

(73) Assignees: The Texas A&M University System, College Station, TX (US); Kaneka Corporation (JP)

( * ) Notice: Subject to any disclaimer, the term of this patent is extended or adjusted under 35 U.S.C. 154(b) by 602 days.

(21) Appl. No.: 12/238,052

(22) Filed: Sep. 25, 2008

(65) Prior Publication Data

US 2009/0105413 A1 Apr. 23, 2009

Related U.S. Application Data

(60) Provisional application No. 60/974,967, filed on Sep. 25, 2007.

(51) Int. Cl.
*C08F 226/10* (2006.01)

(52) U.S. Cl. ......................... 977/774; 977/811; 524/608

(58) Field of Classification Search .................. 977/811, 977/774; 524/608

See application file for complete search history.

(56) References Cited

U.S. PATENT DOCUMENTS

| | | | | |
|---|---|---|---|---|
| 6,649,138 | B2 * | 11/2003 | Adams et al. | 423/403 |
| 7,108,915 | B2 | 9/2006 | Adams et al. | |
| 2005/0008858 | A1 * | 1/2005 | Wakefield et al. | 428/402 |
| 2006/0088713 | A1 | 4/2006 | Dykstra et al. | |

FOREIGN PATENT DOCUMENTS

KR 1020070088390 A 8/2007

OTHER PUBLICATIONS

Guo et al., Chem Mater., Jul. 11, 2000, 12, 2268-2274.*

Manzzor, K. et al., "Energy Transfer from Organic Surface Adsorbate-polyvinyl Pyrrolidone Molecules to Luminescent Centers in ZnS Nanocrystals," Solid State Communication, vol. 129, Feb. 2004 (pp. 469-473).

International Application No. PCT/US2008/077723, International Search Report dated Sep. 1, 2009, 7 pages.

* cited by examiner

*Primary Examiner* — Satya Sastri

(74) *Attorney, Agent, or Firm* — Conley Rose, P.C.

(57) ABSTRACT

A method of forming dispersed water-soluble quantum dots and tuning water-soluble quantum dot aggregate size by providing a plurality of water-soluble quantum dots in a dispersion, the plurality of water-soluble quantum dots are modified with an amphiphilic polymer, and by adding an amount of the amphiphilic polymer to the dispersion such that the ratio of the amphiphilic polymer units to quantum dots is maintained higher to obtain dispersions of smaller quantum dot aggregates and kept lower to obtain dispersions of larger quantum dot aggregates.

23 Claims, 4 Drawing Sheets

10 12 10 12 16 14

WATER-SOLUBLE NANOPARTICLES WITH CONTROLLED AGGREGATE SIZES

CROSS-REFERENCE TO RELATED APPLICATIONS

This application claims the benefit of provisional patent application No. 60/974,967 filed Sep. 25, 2007.

STATEMENT REGARDING FEDERALLY SPONSORED RESEARCH OR DEVELOPMENT

Not applicable.

BACKGROUND

1. Field of the Invention

This invention relates generally to the field of nanoparticles. More specifically this invention relates to a method of controlling nanoparticle aggregation sizes.

2. Background of the Invention

Particles that have at least one dimension within two orders of magnitude of $10^{-9}$ meters are generally considered nanoparticles. Nanoparticles can be thought of as a bridge between individual molecules and solids, as there are small objects that behave as a whole unit in terms of transport and properties. Particularly, due to the small size there are a number of unique properties are displayed by these particles. Quantum dots, hereinafter QDs, are one class of nanoparticles that have been the focus of research and have demonstrated remarkable potential for commercial applications. QDs may exhibit semiconducting, fluorescence, or emissive characteristics. For instance, QDs are being used as suitable alternatives to organic dyes for biological labeling due to their high detection sensitivity and quantum efficiency.

Typically, QDs are composed of inorganic matter and therefore, they are normally insoluble in water. Yet, for use in practical applications, such as biomedical research or substitutes for antimicrobial agents, water solubility is a necessary physical quality. Conventionally, research has been performed to achieve QD water solubility by using various surfactants or ligands. For example, polyvinyl pyrrolidone, hereinafter PVP, is a polymer which is soluble in water. PVP is amphiphilic, having both hydrophobic and hydrophilic components and because it is inert, PVP is safe for ingestion by humans. PVP is used as a binder in many tablets and for applications in the cosmetic industry. This polymer has been used to modify QDs for the purposes of surface passivation and stabilization in non-aqueous systems.

Single QDs and controlled QD aggregate sizes are of particular significance for both commercial applications and fundamental studies of QDs effect on living cells such as bacteria, because different cells may have variable responses to QDs presented at different sizes but possessing the same chemical composition. However, to date, no research has claimed controlled QD aggregate sizes in aqueous solutions favorable for biomedical applications.

Hence, there is a need for new compositions, which could disperse QDs in water without altering the material's chemistry.

BRIEF SUMMARY

In an embodiment, a method of forming individually dispersed water-soluble quantum dots comprises admixing one or more quantum dot precursors in a polymer solution to form water-soluble quantum dots. In addition, the method comprises dispersing the water-soluble quantum dots in a solvent to form a dispersion A method of tuning water-soluble quantum dot aggregate size by providing a plurality of water-soluble quantum dots in a dispersion, wherein the plurality of water-soluble quantum dots are modified with an amphiphilic polymer. The method including adding an amount of the amphiphilic polymer to the dispersion such that the ratio of the amphiphilic polymer units to quantum dots is maintained higher to obtain dispersions of smaller QD aggregates and kept lower to obtain dispersions of larger QD aggregates.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

NOTATION AND NOMENCLATURE

Certain terms are used throughout the following description and claims that refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ".

Additionally, in the discussion and in the claims the term "solution" is used in open-ended fashion, interchangeably with the following, and should be interpreted to mean, without limitation by theory "a suspension," "a mixture", "a colloid," "an emulsion," "a dispersion" or combinations of components maintained in a liquid state.

BRIEF DESCRIPTION OF THE FIGURES

For a detailed description of the preferred embodiments of the invention, reference will now be made to the accompanying drawings in which.

DETAILED DESCRIPTION OF THE PREFERRED EMBODIMENTS

Figure 1:
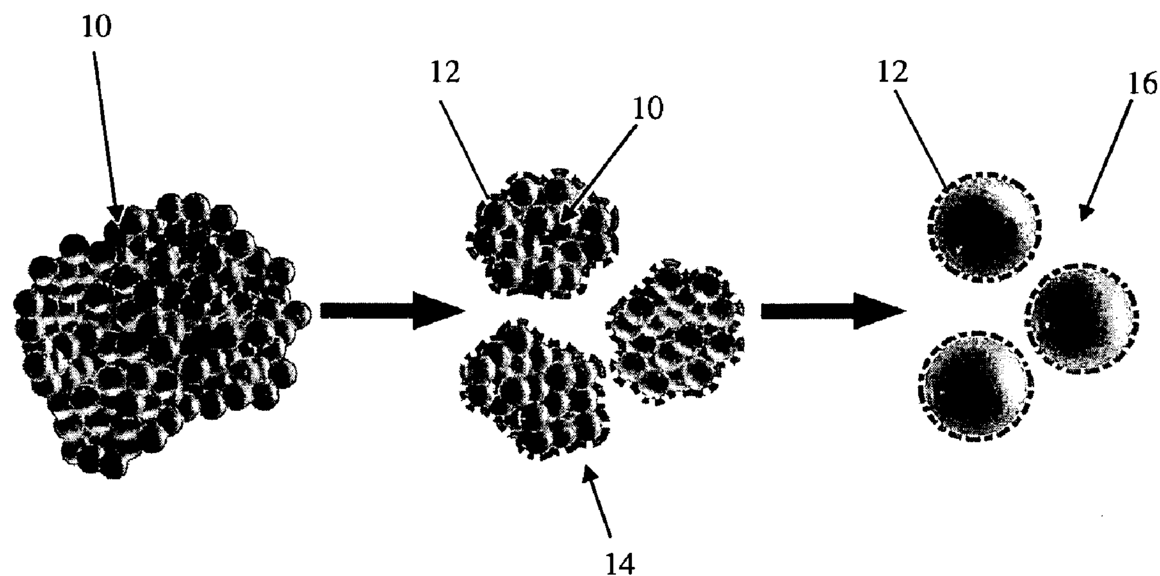
FIG. 1 is a conceptual schematic of the PVP dependent dispersion of ZnO QDs.

FIG. 1 illustrates an embodiment of a method for forming individually dispersed water-soluble quantum dots. The method comprises dispersing one or more quantum dot precursors 10 in a solution containing an amphiphilic polymer 12 to form water-soluble quantum dots 16. Upon formation of the water-soluble quantum dots, the dots typically form aggregates 14. Additional amounts of the amphiphilic polymer 12 may be added to the aggregates of quantum dots to disperse them and form quantum dots 16 dispersed in water. Without being limited to theory, the quantity of the amphiphilic 12 polymer in the solution determines the dispersion of the quantum dot nanoparticles 16. That is, with increasing concentration of the amphiphilic polymer 12, the quantum dot aggregates 14 may become individually dispersed quantum dots 16. As used herein, the phrase "individually dispersed quantum dots" may refer to single particles of quantum dots having an average diameter ranging from about 0.1 nm to about 100 nm, preferably about 1 nm to about 50 nm, and most preferably from about 1 nm to about 10 nm.

In a further embodiment, a method of tuning quantum dot aggregate 14 size comprises increasing the concentration of the amphiphilic polymer 12 in solution to increase dispersion of quantum dot aggregates 14 in solution. In certain instances, the increased concentration of amphiphilic polymer 14 in solution dilutes the quantum dot aggregates 14. Alternatively, adding amphiphilic polymer 12 to a solution comprising quantum dot aggregates 14 increases the dispersion of aggregates 14. An increased concentration of amphiphilic polymer 12 in solution further decreases the size of the aggregates 14. The disclosed method enables fine-tuning of quantum dot aggregate 14 size for a variety of applications such as without limitation, antimicrobial applications, optoelectronic applications, or biomedical applications. The concentration of the amphiphilic polymer is adjusted according to the desired QD aggregate size. The amount of the amphiphilic polymer would also depend of the surface area of the quantum dot.

The one or more quantum dot precursors may comprise any compounds known to those of skill in the art to form quantum dots. In particular, the one or more quantum dot precursors may comprise a semiconductor compound. Examples of suitable semiconductor compounds may include II-VI and III-V semiconductor family compounds and combinations thereof. II-VI semiconductors may comprise an element chosen from each of the groups II and VI of the periodic table of elements. Alternatively, the III-V family of semiconductor compounds may comprise an element chosen from each of the groups III and V of the periodic table of elements. In exemplary embodiments, at least element comprises Zinc (Zn), and the second element comprises Oxygen (O).

In embodiments, the amphiphilic polymer comprises any known amphiphilic polymer to one skilled in the art. As understood by one skilled in the art, the amphiphilic polymer is also a polar polymer comprising a hydrophobic region and a hydrophilic region. In certain instances, the amphiphilic polymer comprises a water-soluble polymer. In exemplary embodiments, the polymer comprises poly (vinyl-pyrrolidone), hereinafter PVP.

In embodiments, water-soluble quantum dots are prepared by hydrolyzing zinc acetate dihydrate in a basic solution in the presence of PVP. The quantum dots are prepared by dissolving zinc acetate dihydrate in a basic solvent. In preferred embodiments, the basic solvent is potassium hydroxide. Alternatively, the basic solvent may comprise any suitable basic solvent known to one skilled in art. In further embodiments, the molar concentration of the potassium hydroxide is between about 5 mM and about 30 mM, more preferably between about 10 mM and about 20 mM, and most preferably between about 15 mM and about 17 mM. In embodiments, zinc acetate dihydrate is mixed directly to the basic solution.

In an embodiment, the molar ratios of $Zn^{2+}$ to the base (eg. KOH) are maintained in a range from about 0.1 to about 3.0, preferably between about 0.3 and about 0.7, and most preferably between about 0.45 and about 0.55. The molar ratios of $Zn^{2+}$ to the vinyl pyrrolidone monomer repeat units are maintained in a range from about 0.4 to about 2.0, preferably between about 0.75 and about 1.0, and more preferably between about 0.83 and about 0.95. The concentration of $Zn^{2+}$ in the solution is maintained in the range from about 8 mM to about 200 mM, preferably between about 20 mM and about 80 mM, and more preferably between about 30 mM and about 50 mM.

In embodiments, the mixed solutions are reacted with mechanical agitation at elevated temperature. Stirring, sonication, shaking and swirling, are all suitable means of mechanical agitation without limitation. In a preferred embodiment, the solution is stirred while being refluxed. The process of reflux is conducted at temperatures preferably closer to the boiling point of the solution. More specifically, the temperature is about 40° C. to about 200° C., preferably between about 50° C. and about 90° C., and in an exemplary embodiment about 60° C. This reaction is continued for between about 1 hour and about 5 hours, preferably about 1 hour and about 3 hours, and most preferably between about 1.75 hours and about 2.25 hours. After refluxing, the ZnO QDs may be considered PVP-capped, or coated quantum dots. In certain instances, the PVP-capped ZnO QDs comprise a yellowish color.

Without being limited by theory, after the reaction has been refluxed, the resulting colloidal solution is concentrated. The concentrated solution may be a concentrated colloidal dispersion in certain embodiments. The solution is concentrated by evaporation under vacuum, at about 20° C. to about 50° C., more preferably between about 30° C. and about 50° C., and in preferred embodiments at about 40° C. The process of evaporation may further be conducted utilizing rotary evaporation, thermal evaporation, flash evaporation, low pressure evaporation, or any combination there of. Alternatively, another means of concentrating a solution by removing solvent as known to one skilled in the art may be used.

In embodiments, the PVP-capped ZnO QDs are precipitated further, forming a gel-like colloidal dispersion. The gel-like colloidal dispersion may comprise a concentrated colloid. The precipitation of the ZnO QDs from the concentrated solution is conducted by the mixing of further solvents to the evaporation-concentrated solution. The solvent may be any solvent known to one skilled in the art. In an exemplary embodiment, the solvents hexane and isopropanol are mixed to the concentrated colloidal dispersion or gel-like material. The volume ratio of concentrated colloidal dispersion to hexane is in the range from about 0.05 to about 1, preferably between about 0.1 and about 0.3 and more preferably between about 0.18 and about 0.23. The volume ratio of concentrated colloidal dispersion to isopropanol is in the range from about 0.3 to about 3, preferably between about 0.7 and about 1.2 and more preferably between about 0.9 and about 1.1. In embodiments, the mixture is kept at about 0° C. until the PVP-capped ZnO QD aggregates are fully precipitated to the bottom of the container. In additional embodiments, the container is centrifuged to further sediment gel-like ZnO QDs and remove the supernatant. After centrifugation and removal of the supernatant, gel-like ZnO QDs are redispersed in a solvent. In embodiments, the solvent comprises hexane, water, benzene, toluene, acetone, ethanol, or methanol, in the preferred embodiment the solvent is methanol. Without being limitation by theory, the washing the gel-like ZnO QDs in solvent is repeated between about ten times, preferably between about one and three times, and in exemplary embodiments about two times to purify the PVP-capped ZnO QDs. The purified PVP-capped ZnO QDs are redispersed in a solvent, such as without limitation, methanol. All solvents are fully removed by evaporation methods previously discussed hereinabove. Alternatively, the solvent may be removed by any suitable means as known to one skilled in the art. In a preferred embodiment, solvent is removed via rotary evaporation under vacuum. A small quantity of aqueous solvent is added to the dried PVP-capped ZnO QDs to re-form the gel-like dispersion of ZnO QDs. The solvent may comprise any suitable aqueous solvent as known to one skilled in the art. In the certain instances, the solvent comprises distilled de-ionized water. In further embodiments, the volume of solvent is between about 1 milliliter and about 10 milliliters, preferably between about 2 milliliters and about 9 milliliters, and most preferably between about 4 milliliters and about 6 milliliters of distilled de-ionized water. In further embodiments, the amphiphilic polymer capped, or coated QD aggregates are stable in water for at least a year.

To further illustrate various representative embodiments of the present invention, the following example is provided.

EXAMPLE

Preparation of Gel-Like ZnO QDs

KOH (99.99%, obtained form Sigma-Aldrich) at 16 mM and 1.332 g of PVP (MW 8000, obtained from Sigma-Aldrich) were first dissolved in 200 ml methanol at 60° C. with refluxing and stirring for 30 minutes to yield a homogeneous solution. Subsequently, 40 μM of zinc acetate dihydrate (99%, obtained from Fluka) was added directly to the basic methanol solution. The concentrations of $Zn^{2+}$ and $K^+$, with a molar ratio of $[Zn^{2+}]/[K^+]=0.5$, were prepared to be 40 and 80 mM, respectively. The molar ratio of $[Zn^{2+}]$ to PVP (repeat unit) is 1:1.5. This starting solution was then allowed to react at 60° C. with refluxing and stirring. After 2 hours of reaction time, the colloidal dispersion was concentrated by 10 times at 40° C. via rotary evaporation under vacuum.

Yellowish PVP-capped ZnO QDs precipitated, and gel-like ZnO QDs were formed immediately after adding hexane and isopropanol to the concentrated colloids with a volume ratio of hexane:concentrated colloidal dispersion:isopropanol of 5:1:1. The mixture was kept at 0° C. for 12 hours until the PVP-capped ZnO QD aggregates had fully sedimented to the bottom of the container. After centrifugation and removal of the supernatant, gel-like ZnO QDs were redispersed in methanol. The above operations were repeated at least two times to purify the PVP-capped ZnO QDs. The purified PVP-capped ZnO QDs were redispersed in methanol, and then the methanol and remaining solvents were fully removed via rotary evaporation under vacuum. Five milliliters of distilled, deionized water was added to the dried PVP-capped ZnO QDs to form the gel-like dispersion of ZnO QDs. This gel-like sample (hereafter designated "Sample A") contained approximately 0.6 g of ZnO QDs.

Characterization of Gel-Like and Water-Soluble ZnO QDs

Figure 2:
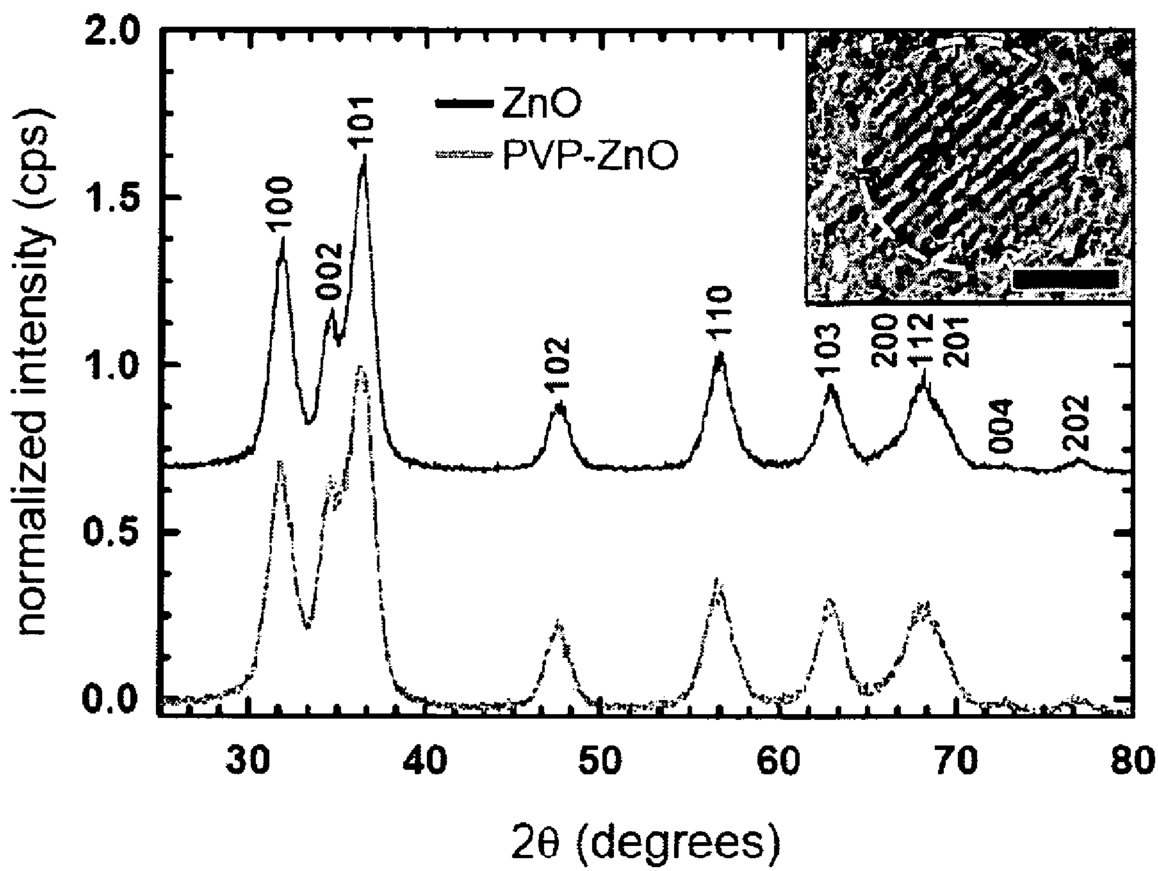
FIG. 2 is an x-ray diffraction graph comparing PVP capped and uncapped ZnO QDs.

FIG. 2 illustrates an X-ray diffraction (XRD) powder pattern of the PVP-capped ZnO QDs, generated with a Bruker D8 Advanced Powder X-ray Diffractometer using Cu—$K_\alpha$ incident radiation (λ=1.5418 Å). After washing, the XRD samples were made from the gel-like ZnO QDs by drying them at 110° C. for 2 hours and grinding the resulting powder with a mortar and pestle.

High-resolution transmission electron microscopy (HR-TEM) of purified PVP-capped ZnO QDs was carried out using a JEOL 2010 HR-TEM operated at 200 kV. TEM samples were made by taking purified PVP-capped ZnO QDs and redispersed them in methanol, diluting the mixture, and then placing a drop of the colloidal dispersion onto a 400-mesh carbon-coated copper grid. The grid was then dried in a desiccator for one day prior to imaging.

Dynamic light scattering (DLS) of PVP-capped ZnO QDs in water was carried with a ZetaPALS (Brookhaven Instruments). Colloidal samples were diluted to achieve the highest signal with minimum noise. Samples A through E were tested in addition to PVP without ZnO. The acquired autocorrelation function was fit with numerical methods, and the structure factor and time-dependent intensity was used to quantify average hydrodynamic mobilities, which are directly related to aggregate/single particle size.

The inset in FIG. 2 shows the TEM image of a single PVP-capped ZnO QD. This crystalline QD particle is representative of the spherical shape seen for nearly all particles observed. TEM also revealed a relatively uniform size distribution that was estimated to be around 4 to 5 nm. The corresponding XRD powder pattern (FIG. 1) exhibits the Wurtzite structure of ZnO. The calculation of average particle size, t, based on the Debye-Scherrer formula is given by $$t=0.89\lambda/(\beta\cos\theta),$$

where λ is the X-ray wavelength (1.5418 Å), β is the full width at half maximum of the diffraction peak, and θ is the diffraction angle. From this equation we found t≈4.2 nm, which is consistent with TEM observations.

Preparation of Water-Soluble ZnO QDs with Controlled Aggregate Sizes

PVP is added to the gel-like sample and then water is added. By varying the quantity of PVP, control over the size of the aggregate is achieved. This is illustrated by making five samples, designated by letters A, B, C, D and E.

From the abovementioned gel-like sample (FIG. 3A) from example 1, 0.1 g of ZnO QDs was dispersed into 100 ml of water. After sonication, the dispersion was cloudy due to scattering from ZnO aggregates (FIG. 3B). PVP (at 10, 20, and 30 g) was added to the gel-like sample (0.1 g ZnO QDs), and then water was added to each sample until a total volume of 100 ml was reached. These three samples are illustrated as FIGS. 3C, 3D, and 3E, respectively.

Figure 3:
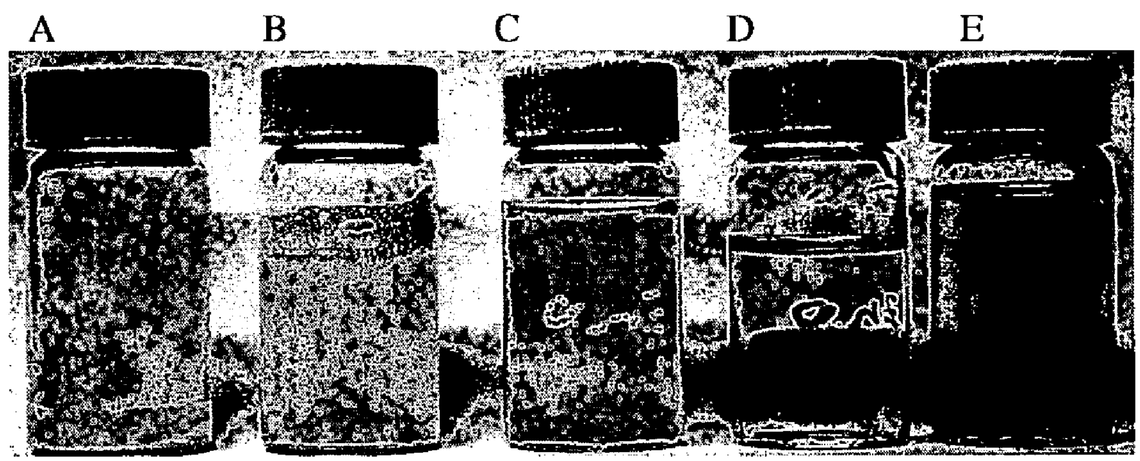
FIG. 3 is an illustration comparing the formation of five samples gel-like ZnO QD solutions.
Figure 4:
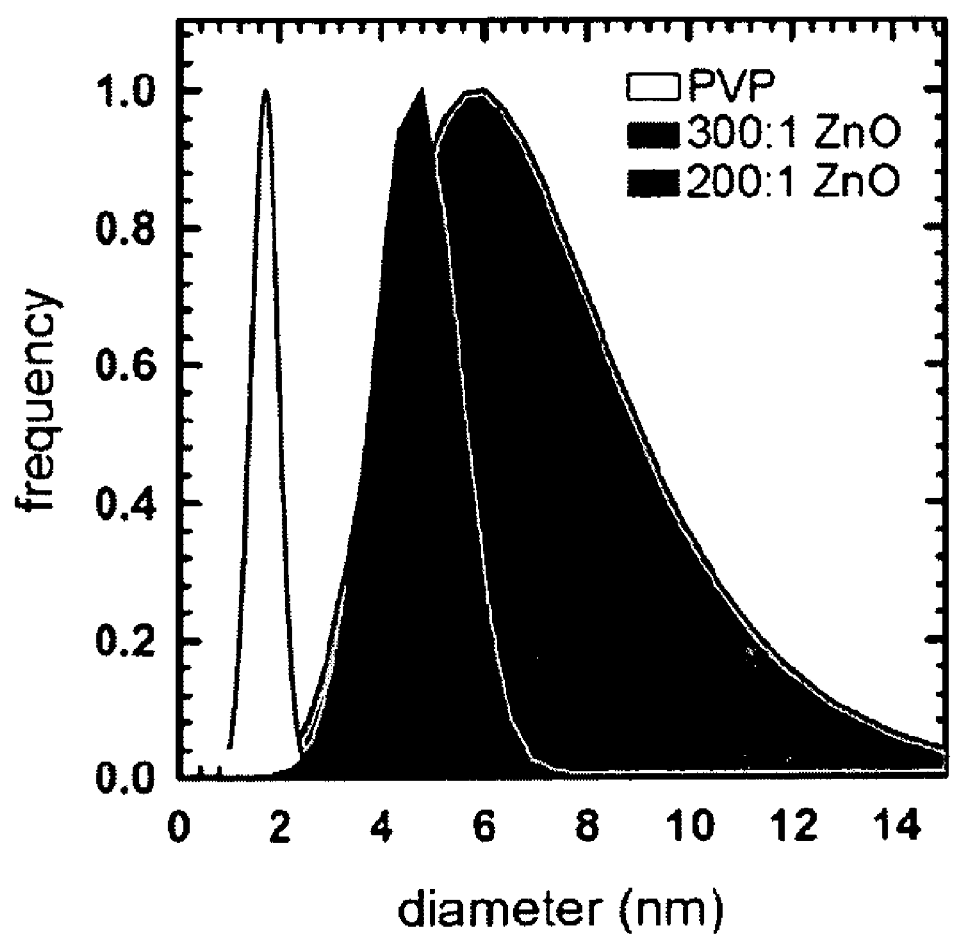
FIG. 4 is a graph to illustrate the light scattering of samples of ZnO QD gel-like solutions.

FIG. 3 shows images of the purified gel-like ZnO QDs (FIG. 3A) and ZnO QDs dispersed in water using different amounts of PVP (FIG. 3B-E). A gradual decrease in light scattering is seen as the amount of added PVP increases, which is consistent with a reduction in aggregate size. In the case of FIG. 3B, no additional PVP is added following the initial synthesis, and the large ZnO QD aggregates (100s of microns in size) scatter the visible light to the degree that the solution is nearly opaque. When the PVP:ZnO=100:1 as shown in FIG. 3C, the solution becomes translucent because of the reduction of ZnO QD aggregate size, but the ZnO QD aggregates are still at the scale of hundreds of nanometers to several microns. As the amount of PVP increases to yield PVP:ZnO=200:1 (FIG. 3D), the solution becomes clear, indicating that the ZnO QD aggregates have been decreased to below 100 nm in size, where visible light is no longer scattered. In FIG. 3E, where even more PVP is added, it shows similar transparency to that shown in FIG. 3D, but the dispersion is slightly yellow. Dynamic light scattering as illustrated in FIG. 4, has been used to estimate the actual ZnO QD aggregate sizes in the samples shown for FIGS. 3D and 3E. The average size of ZnO QD aggregates in FIG. 3D is estimated to be around 10 nm with a wide tail extending to 14 nm, indicating that the dispersion contains a low percentage of individually dispersed ZnO QDs. In the case of the sample in FIG. 3E, the 4-5 nm average particle size points to single ZnO QDs dispersed in water. Therefore, by adjusting the amount of PVP used, ZnO QDs can be tuned from micron-sized aggregates down to single QDs in water. FIG. 1 illustrates this concept schematically.

While the preferred embodiments of the invention have been shown and described above, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

We claim:

1. A method of forming dispersed water-soluble quantum dots, comprising:

a) forming a polymer solution;

b) mixing a quantum dot precursor solution in the polymer solution to form a capped quantum dot solution having a polymer concentration;

c) altering the polymer concentration in the capped quantum dot solution to disperse the quantum dots by adding additional polymer solution to the capped quantum dot solution; and d) re-suspending the quantum dots in an aqueous solution to form dispersed water-soluble quantum dots.

2. The method of claim 1 wherein a) comprises dissolving an amphiphilic polymer in a basic solution.

3. The method of claim 2 wherein the amphiphiliic polymer solution comprises poly (vinyl-pyrrolidone).

4. The method of claim 2 wherein the basic solution comprises at least one hydroxide base.

5. The method of claim 1 wherein the quantum dot precursor solution comprises at least one chosen from the group consisting of Group II-VI compounds, Group III-V compounds and combinations thereof.

6. The method of claim 5 wherein the quantum dot precursor solution comprises Zinc ($Zn^{2+}$) and Oxygen.

7. The method of claim 1 wherein the quantum dot precursor solution comprises a quantum dot precursor dissolved in a basic solution before b).

8. The method of claim 7 wherein the basic solution comprises at least one hydroxide.

9. The method of claim 7 further comprising mixing the Zinc ($Zn^{2+}$) quantum dot precursor solution with the basic solution at a molar ratio of at least 0.1:1.

10. The method of claim 1 wherein b) comprises mixing the quantum dot precursor solution and the polymer solution at a volume ratio of at least 1:1.5.

11. The method of claim 1 wherein c) comprises refluxing the capped quantum dot solution at temperature of at least 45° C.

12. The method of claim 1 wherein c) comprises mechanical agitation of the capped quantum dot solution.

13. The method of claim 1 wherein c) comprises evaporating the solution at temperature of at least 20° C.

14. The method of claim 1 wherein c) comprises forming a gel-like precipitate.

15. The method of claim 14 further comprising washing the gel-like precipitate in a solvent.

16. The method of claim 15 wherein the volume ratio of gel-like precipitate to solvent is at least 0.1:1.

17. The method of claim 1 wherein d) further comprises the steps of centrifugation and supernatant removal.

18. A method of tuning water-soluble quantum dot aggregate size comprising:

a) providing a plurality of water-soluble quantum dots in a dispersion, wherein the plurality of water-soluble quantum dots are modified with an amphiphilic polymer;

b) adding an amount of the amphiphilic polymer to the dispersion such that the amphiphilic polymers disperse the quantum dot aggregates.

19. The method of claim 18 wherein the amphiphilic polymer is poly(vinyl pyrrolidone).

20. The method of claim 18 wherein the plurality of water-soluble quantum dots comprise at least one compound chosen from the group consisting of Group II-VI, Group III-V compounds, and combinations thereof.

21. The method of claim 18 wherein the plurality of water-soluble quantum dots comprises ZnO.

22. The method of claim 18 wherein the molar ratio of plurality of water-soluble quantum dots to the amphiphilic polymer is at least 0.75:1.

23. The method of claim 21 wherein the molar ratio of plurality of water-soluble quantum dots to the amphiphilic polymer is at least 0.4:1.

* * * * *